United States Patent
Shen et al.

(10) Patent No.: US 10,906,478 B2
(45) Date of Patent: Feb. 2, 2021

(54) VEHICLE DOOR ASSEMBLIES INCLUDING FRONT END ENGAGED LOWER MOLDING COMPONENTS

(71) Applicants: Toyota Motor Engineering & Manufacturing North America, Inc., Plano, TX (US); Hinduja Tech, Inc., Novi, MI (US)

(72) Inventors: Mingher F. Shen, Ann Arbor, MI (US); Nora Arellano, Ann Arbor, MI (US); Ansari Ahamed Abdul Shukkoor, Ann Arbor, MI (US)

(73) Assignee: Toyota Motor Engineering & Manufactuirng North America, Inc., Plano, TX (US)

( * ) Notice: Subject to any disclaimer, the term of this patent is extended or adjusted under 35 U.S.C. 154(b) by 100 days.

(21) Appl. No.: 16/265,383

(22) Filed: Feb. 1, 2019

(65) Prior Publication Data
US 2020/0247333 A1    Aug. 6, 2020

(51) Int. Cl.
*B60R 13/04*    (2006.01)
*B60J 5/04*    (2006.01)

(52) U.S. Cl.
CPC ............. *B60R 13/04* (2013.01); *B60J 5/0493* (2013.01); *B60J 5/0413* (2013.01); *B60J 5/0415* (2013.01)

(58) Field of Classification Search
CPC ....... B60R 13/04; B60J 5/0413; B60J 5/0415; B60J 5/0493

(Continued)

(56) References Cited

U.S. PATENT DOCUMENTS 9,688,218 B2 *    6/2017    Makita ................. B60R 13/043
2014/0292012 A1 *    10/2014    Yoshida ................. B60R 13/04
                                                                    296/1.08

(Continued)

FOREIGN PATENT DOCUMENTS

CN    103057386 B    3/2015
JP    09272339 A    10/1997

(Continued)

OTHER PUBLICATIONS

"Belt Molding—Toyota" https://parts.grahamtoyota.com/oem-parts/toyota-belt-molding-7572235011?c=bT0xJmw9MiZuPVJIY29tbWVuZGVkIFByb2R1Y3Rz Accessed Date: Oct. 17, 2018.

*Primary Examiner* — Joseph D. Pape
*Assistant Examiner* — Dana D Ivey
(74) *Attorney, Agent, or Firm* — Dinsmore & Shohl LLP (57) ABSTRACT

A vehicle includes a door assembly including an outer door panel and an inner door panel defining a volume therebetween and a window frame that receives a window therein. A molding assembly includes a corner molding component including a portion that extends along an A-pillar portion of the window frame and a portion that extends along a lower portion of the window frame. A lower molding component extends along the lower portion of the window frame having a connector receiving notch located at a front end of the lower molding component that defines at least part of a catch tab portion. An engagement component comprising a body that is connected to the portion of the corner molding component that extends along the lower portion of the window frame and a connector that projects outward in a vehicle lateral direction and engages the catch tab portion thereby connecting the corner molding component and the lower molding component.

14 Claims, 5 Drawing Sheets

(58) Field of Classification Search
USPC .......................................................... 296/1.08
See application file for complete search history.

(56) References Cited

U.S. PATENT DOCUMENTS

| | | |
|---|---|---|
| 2018/0170161 A1 | 6/2018 | Makita et al. |
| 2018/0170285 A1 | 6/2018 | Itoh |
| 2018/0229590 A1 | 8/2018 | Bito |

FOREIGN PATENT DOCUMENTS

| | | |
|---|---|---|
| JP | 3525692 B2 | 5/2004 |
| JP | 3877200 B2 | 2/2007 |
| JP | 20130382408 A | 5/2013 |
| JP | 2013116688 A | 6/2013 |
| JP | 2015016816 A | 1/2015 |
| JP | 6368612 B2 | 8/2018 |

* cited by examiner

VEHICLE DOOR ASSEMBLIES INCLUDING FRONT END ENGAGED LOWER MOLDING COMPONENTS

TECHNICAL FIELD

The present specification generally relates to vehicle door assemblies and, more specifically, to vehicle door assemblies that include front end engaged lower molding components.

BACKGROUND

Vehicles may include various molding and other trim components for covering gaps and to provide an aesthetic appearance. Belt moldings are examples that are positioned along a window frame of the vehicle doors. Belt moldings are often formed as elongated strips and may have an appearance that is different from an adjacent outer door panel. Because these belt moldings may be located near vehicle windows, the belt moldings can be a source of wind noise, particularly when a gap around the belt molding is present. What is needed is an engagement component that engages an end of the belt moldings to secure them to an adjacent component to reduce gap sizes and resulting wind noise.

SUMMARY

In one embodiment, a vehicle includes a door assembly including an outer door panel and an inner door panel defining a volume therebetween and a window frame that receives a window therein. A molding assembly includes a corner molding component including a portion that extends along an A-pillar portion of the window frame and a portion that extends along a lower portion of the window frame. A lower molding component extends along the lower portion of the window frame having a connector receiving notch located at a front end of the lower molding component that defines at least part of a catch tab portion. An engagement component comprising a body that is connected to the portion of the corner molding component that extends along the lower portion of the window frame and a connector that projects outward in a vehicle lateral direction and engages the catch tab portion thereby connecting the corner molding component and the lower molding component.

In another embodiment, a molding assembly includes a corner molding component including a portion that extends along an A-pillar portion of a vehicle window frame and a portion that extends along a lower portion of the vehicle window frame. A lower molding component that extends along the lower portion of the vehicle window frame having a connector receiving notch located at a front end of the lower molding component that defines at least part of a catch tab portion. An engagement component includes a body that is connected to the portion of the corner molding component that extends along the lower portion of the vehicle window frame and a connector that projects outward in a vehicle lateral direction and engages the catch tab portion thereby connecting the corner molding component and the lower molding component.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are generally related to vehicles including vehicle door assemblies that include molding assemblies along window frames of the vehicle door assemblies. The molding assemblies may include multiple moldings that are arranged side-by-side along the window frames. The molding assemblies may include a corner molding at a front corner of the window frame and a lower molding component that extends rearward from the corner molding. An engagement component is provided that engages both the corner molding and the lower molding component that holds the lower molding component to the corner molding and reduces a distance between ends of the moldings.

Figure 1:
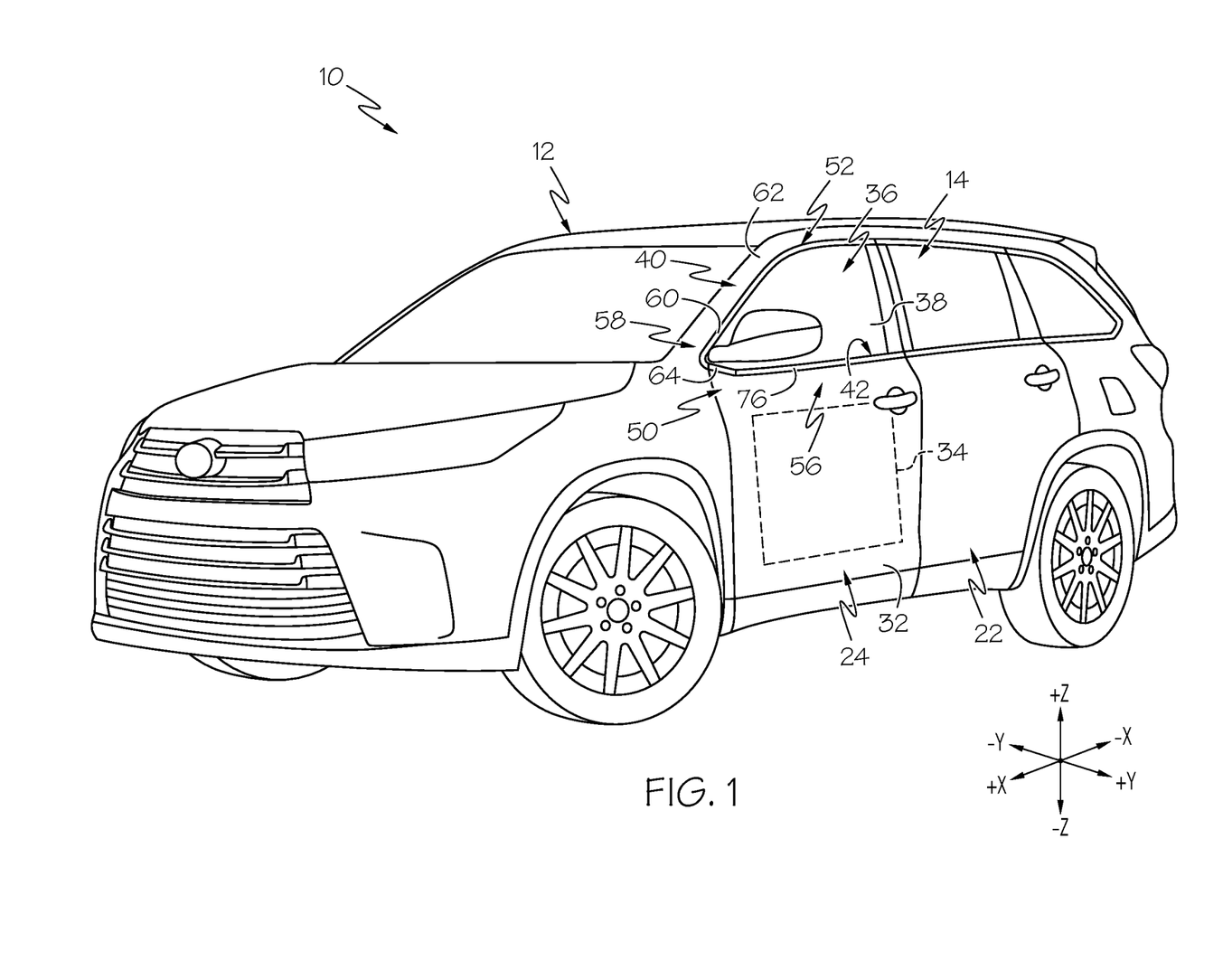
FIG. 1 depicts a side view of a vehicle including a molding assembly, according to one or more embodiments shown and described herein.

As used herein, the term "vehicle longitudinal direction" refers to the forward-rearward direction of the vehicle 10 (i.e., in the +/− vehicle X-direction depicted in FIG. 1). The term "vehicle lateral direction" refers to the cross-vehicle direction of the vehicle (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction as depicted). Further, the terms "inboard" and "outboard" are used to describe the relative positioning of various components relative to a centerline of the vehicle. Because the vehicle structure of the vehicle may be generally symmetrical about the vehicle centerline, the use of terms "inboard" and "outboard" may be switched when evaluating components positioned along opposite sides of the vehicle.

Referring now to FIG. 1, a vehicle 10 according to various embodiments is illustrated. It is noted that while the vehicle 10 is depicted as a passenger van, the vehicle 10 may be any passenger vehicle 10 such as, for example, a terrestrial, aquatic, and/or airborne vehicle. The vehicle 10 includes a body 12 characterizing a frame of the vehicle 10. The body 12 of the vehicle 10 defines an interior passenger compartment 14.

The vehicle 10 includes a number of door assemblies enclosing the interior of the vehicle 10. Each door assembly is slidingly, pivotally, or otherwise connected to the body 12 of the vehicle 10 such that the door assembly is capable of moving between a closed position and an open position. In particular, a rear passenger door assembly 22 may be slidingly connected to the body 12 of the vehicle 10 and a front door assembly 24 may be pivotally connected to the body 12 of the vehicle 10. It is noted that while the remaining description will focus on molding assemblies as part of a front door assembly 24, similar molding assemblies may be utilized in sliding passenger doors.

The door assembly 24 is constructed from rigidly interconnected door frame members and door panels, as well as any combination of overlying panels, trim, upholstery and other door coverings. The door panels include an outer door panel 32 and an inner door panel interior to the outer door panel 32. In some embodiments, there may be additional outer and/or inner door panels. The inner door panel 30 and the outer door panel 32 are spaced apart from one another in the vehicle lateral direction. As a result, the rear passenger door assembly 22 has an interior door cavity 34 defined between the inner door panel 30 and the outer door panel 32.

The interior door cavity 34 can house various components of the front door assembly 24. In particular, the interior door cavity 34 houses a window assembly 36 that includes a window 38. The outer door panel 32 and the inner door panel together define a window frame 40 for the window 38. The vehicle window 38 may be extendable to a closed position and retractable to an open position into the volume between the outer door panel 32 and the inner door panel using a window regulator operatively connected to the window 38 and an electric motor operatively connected to the window regulator. An opening 42 is provided at the window frame 40 from which the window 38 extends into the window frame 40 when in a closed position.

A molding assembly 50 is provided about the window frame 40 and window 38. The molding assembly 50 includes an upper molding component 52 that extends along an upper side rail 54, a lower molding component 56 (sometimes referred to as a belt molding) that extends along the outer door panel 32 at the opening 42 and a corner molding component 58 that includes a portion 60 that extends along an A-pillar 62 and a portion 64 that extends along the outer door panel 32 adjacent the lower molding component 56. In some embodiments, the corner molding component 58 may include the upper molding component 52 such that the corner molding component 58 extends about the window frame 40 from the lower molding component 56, along the upper side rail 54 to a B-pillar 66. The corner molding component 58 is connected end-to-end to the lower molding component 56 to reduce a distance between the corner molding component 58 and the lower molding component 56.

Figure 2:
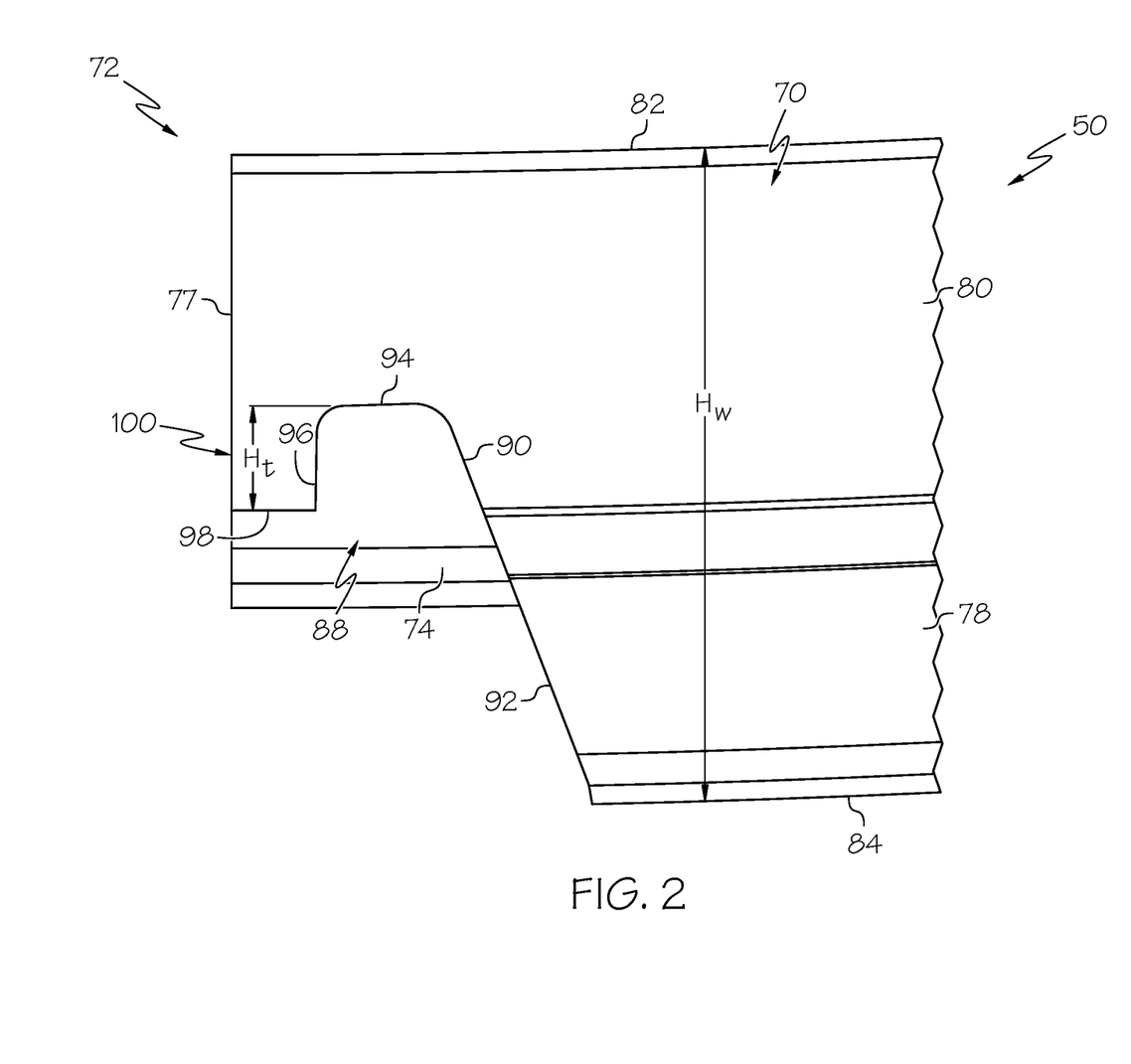
FIG. 2 is an inboard view of a lower molding component of the molding assembly of FIG. 1, according to one or more embodiments shown and described herein.

Referring to FIG. 2, an inboard side 70 of a front end 72 of the lower molding component 56 is illustrated in isolation. The lower molding component 56 generally includes an outboard facing wall 74 with an outboard face 76 (FIG. 1) and an inboard facing wall 78 with an inboard face 80. The outboard facing wall 74 and the outboard face 76 are the visible trim surface along the window frame 40. The inboard facing wall 78 includes a top edge 82, a bottom edge 84 and a front edge 77. A connector receiving notch 88 is provided at the front end 72. The connector receiving notch 88 includes a perimeter 90 having a rearward portion 92 that extends in the vehicle vertical direction to an upper portion 94. The upper portion 94 extends in the vehicle longitudinal direction from the rearward portion 92 toward a forward portion 96. The forward portion 96 extends in the vehicle vertical direction to a lower edge 98 of a catch tab portion 100 formed by the inboard facing wall 78. As can be seen, a height $H_t$ of the catch tab portion 100 measured in the vehicle vertical direction from the upper portion 94 to the lower edge 98 is less than a height $H_w$ of the inboard facing wall 78.

Figure 3:
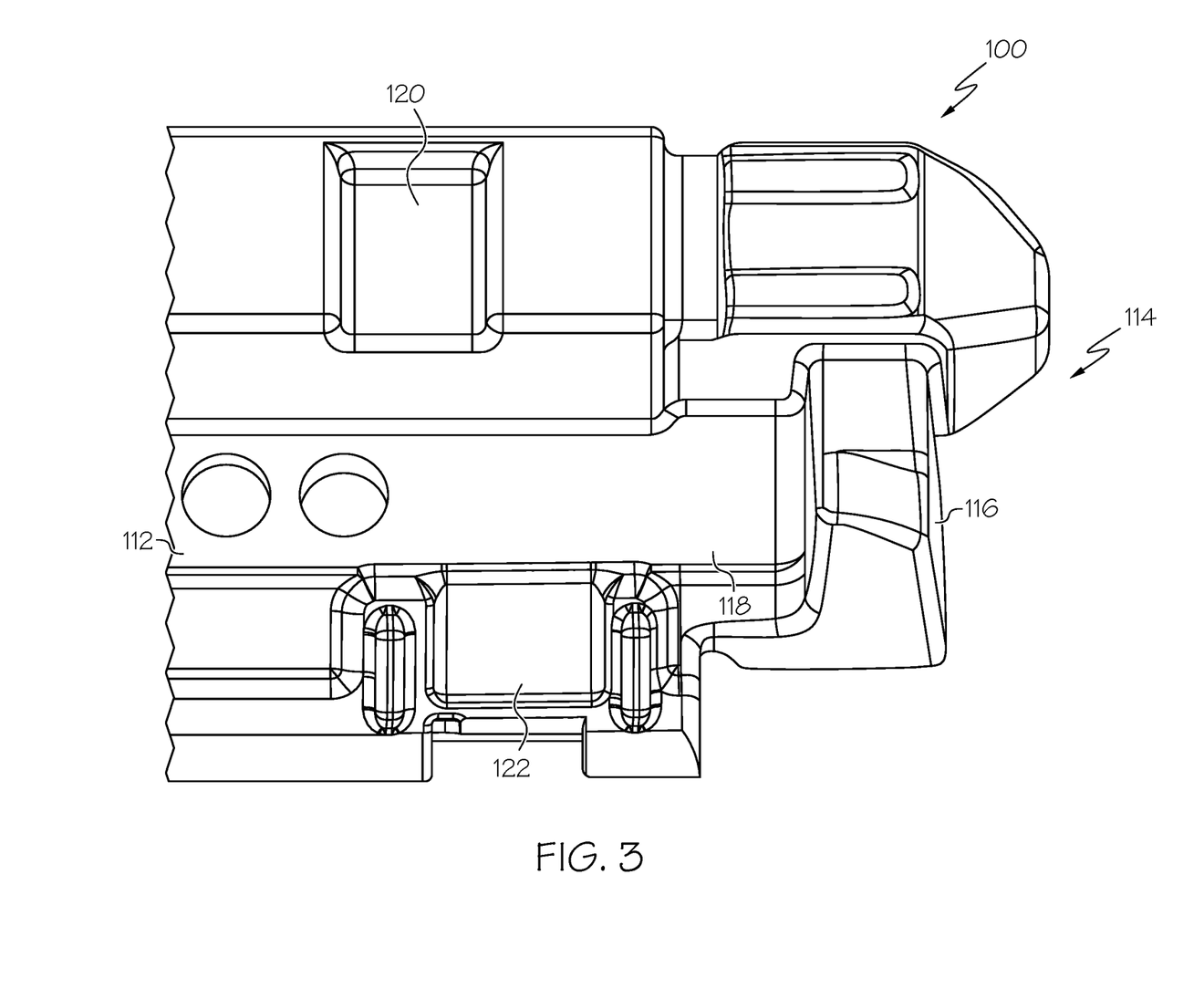
FIG. 3 is an inboard view of an engagement component for use with the molding assembly of FIG. 1, according to one or more embodiments shown and described herein.

Referring to FIG. 3, an engagement component 110 is illustrated in isolation that engages both the corner molding component 58 and the lower molding component 56 and holds the lower molding component 56 to the corner molding component 58 and reduces a distance between ends of the moldings components. The engagement component 110 includes a body 112 that includes a rear end 114 and a connector 116 that projects outwardly from a side 118 of the body 112 in the vehicle lateral direction. The body 112 further includes tab receiving recesses 120 and 122 that extend laterally into the body 112 that are sized and located to receive connector tabs 124 and 126 (FIG. 5) that are used to connect the engagement component 110 to the corner molding component 58.

The connector 116 projects outwardly from the side 118 of the body 112 forming a hook shape. The connector 116 is sized to be received within the connector receiving notch 88 of the lower molding component 56 and engage the catch tab portion 100 to hold the lower molding component 56 from moving away from the corner molding component 58 in the vehicle longitudinal direction. The rear end 114 is sized to be received between the outboard facing wall 74 and the inboard facing wall 78 of the lower molding component.

Figure 4:
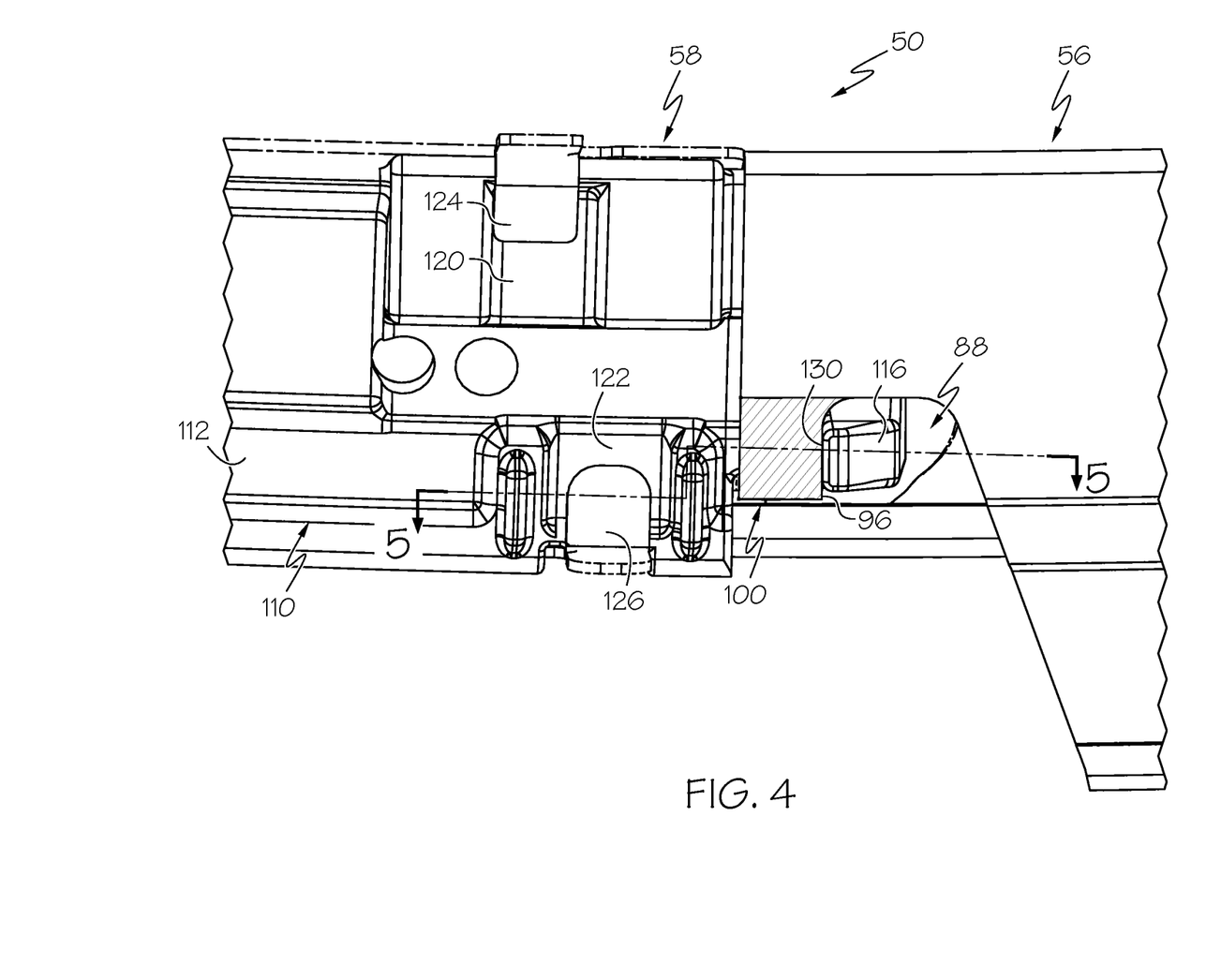
FIG. 4 is an inboard view of a lower molding component connected to a corner molding component of the molding assembly of FIG. 1 connected using the engagement component of FIG. 3, according to one or more embodiments shown and described herein.
Figure 5:
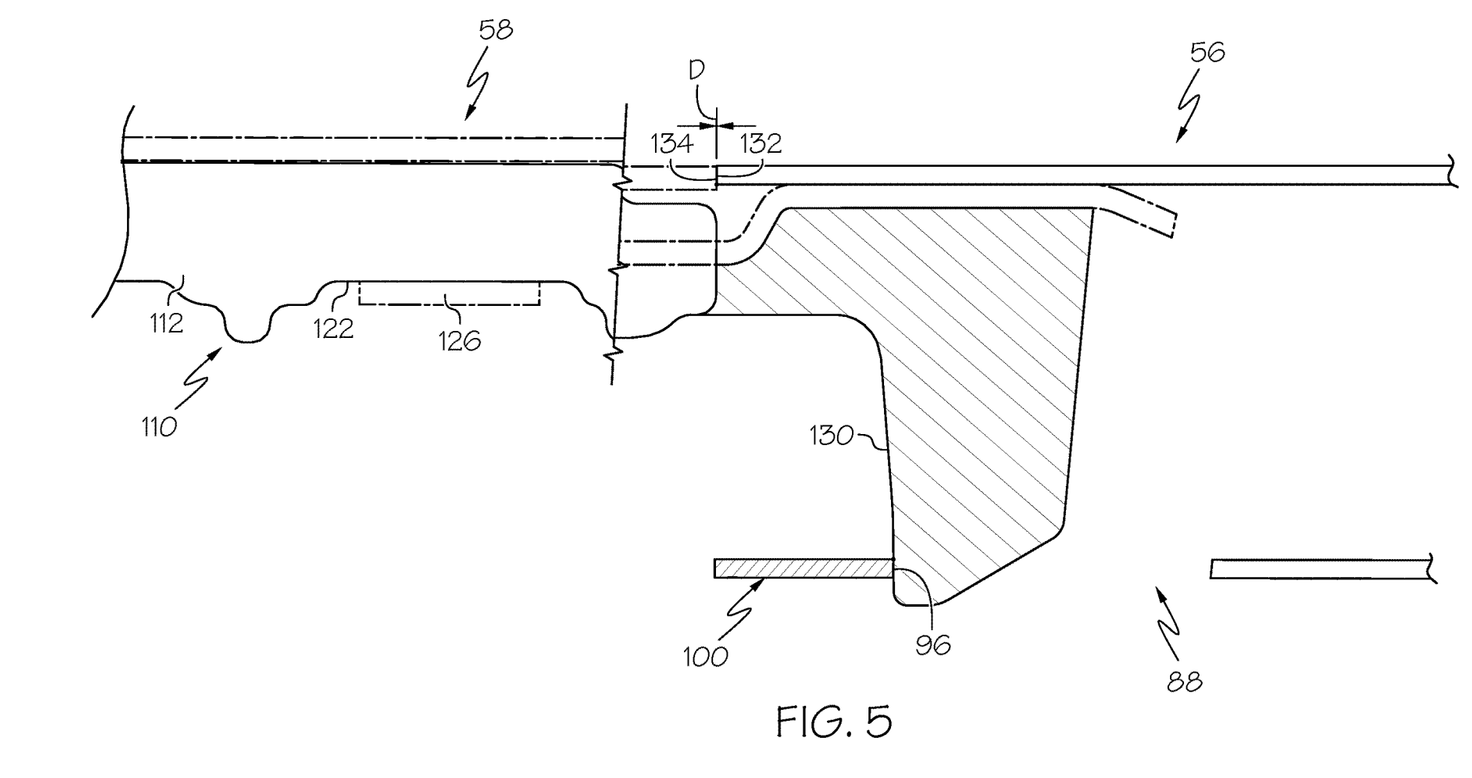
FIG. 5 is a section view along lines 5-5 of FIG. 4 showing the lower molding component connected to the corner molding component using the engagement component, according to one or more embodiments shown and described herein.

FIGS. 4 and 5 illustrate operation of the connector 116 to hold the corner molding component 58 and the lower molding component 56 together. The molding assembly 50 includes the lower molding component 56 and the corner molding component 58 (shown by dotted lines). The engagement component 110 is connected to both the corner molding component 58 and the lower molding component 56. The engagement component 110 is connected to the corner molding component 58 by the connector tabs 124 and 126 that are received within the tab receiving recesses 120 and 122 to fasten the engagement component 110 to the corner molding component 58. The connector 116 projects outwardly from the body 112 and is received within the connector receiving notch 88. The connector 116 has an engaging surface 130 that engages the forward portion 96 of the catch tab portion 100, which is shown in hatching for illustration, which draws front edge 132 of the outboard facing wall 74 (see FIG. 2) toward a rear edge 134 of the corner molding component 58, thereby reducing a distance D therebetween. In some embodiments, the distance D may be less than about 4 mm, such as less than about 1 mm, such as less than about 0.5 mm, such as less than about 0.2 mm.

The above-described molding assemblies use an engagement component to draw adjacent molding components together and reduce and maintain a maximum distance therebetween. The engagement components can connect to a corner molding component and then connect to a lower molding component in a snap-fit type of connection by inserting a hook-shaped connector into a connector receiving notch of the lower molding component.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
a door assembly comprising an outer door panel and an inner door panel defining a volume therebetween and a window frame that receives a window therein;
a molding assembly comprising:
a corner molding component including a portion that extends along an A-pillar portion of the window frame and a portion that extends along a lower portion of the window frame;
a lower molding component that extends along the lower portion of the window frame having a connector receiving notch located at a front end of the lower molding component that defines at least part of a catch tab portion; and
an engagement component comprising a body that is connected to the portion of the corner molding component that extends along the lower portion of the window frame and a connector that projects outward in a vehicle lateral direction and engages the catch tab portion thereby connecting the corner molding component and the lower molding component.

2. The vehicle of claim 1, wherein the connector receiving notch has a perimeter having a rearward portion that extends in a vehicle vertical direction to an upper portion that extends in a vehicle longitudinal direction from the rearward portion toward a forward portion that extends in the vehicle vertical direction to a lower edge of the catch tab portion.

3. The vehicle of claim 1, wherein the engagement component comprises a tab receiving recess that extends into the body.

4. The vehicle of claim 3, wherein the portion of the corner molding component that extends along the lower portion of the window frame comprises a connector tab that is received within the tab receiving recess.

5. The vehicle of claim 1, wherein a distance between a front edge of the lower molding component and a rear edge of the portion of the corner molding component that extends along the lower portion of the window frame is less than about 1 mm.

6. The vehicle of claim 1, wherein a distance between a front edge of the lower molding component and a rear edge of the portion of the corner molding component that extends along the lower portion of the window frame is less than about 0.2 mm.

7. The vehicle of claim 1, wherein the lower molding component comprises an outboard facing wall and an inboard facing wall, wherein the connector receiving notch is formed by the inboard facing wall, the engagement component having an end that is received between the outboard facing wall and the inboard facing wall.

8. A molding assembly comprising:
a corner molding component including a portion that extends along an A-pillar portion of a vehicle window frame and a portion that extends along a lower portion of the vehicle window frame;
a lower molding component that extends along the lower portion of the vehicle window frame having a connector receiving notch located at a front end of the lower molding component that defines at least part of a catch tab portion; and
an engagement component comprising a body that is connected to the portion of the corner molding component that extends along the lower portion of the vehicle window frame and a connector that projects outward in a vehicle lateral direction and engages the catch tab portion thereby connecting the corner molding component and the lower molding component.

9. The molding assembly of claim 8, wherein the connector receiving notch has a perimeter having a rearward portion that extends in a vehicle vertical direction to an upper portion that extends in a vehicle longitudinal direction from the rearward portion toward a forward portion that extends in the vehicle vertical direction to a lower edge of the catch tab portion.

10. The molding assembly of claim 8, wherein the engagement component comprises a tab receiving recess that extends into the body.

11. The molding assembly of claim 10, wherein the portion of the corner molding component that extends along the lower portion of the window frame comprises a connector tab that receives the tab receiving recess.

12. The molding assembly of claim 8, wherein a distance between a front edge of the lower molding component and a rear edge of the portion of the corner molding component that extends along the lower portion of the window frame is less than about 1 mm when assembled.

13. The molding assembly of claim 8, wherein a distance between a front edge of the lower molding component and a rear edge of the portion of the corner molding component that extends along the lower portion of the window frame is less than about 0.2 mm when assembled.

14. The molding assembly of claim 8, wherein the lower molding component comprises an outboard facing wall and an inboard facing wall, wherein the connector receiving notch is formed by the inboard facing wall, the engagement component having an end that is received between the outboard facing wall and the inboard facing wall.

* * * * *

UNITED STATES PATENT AND TRADEMARK OFFICE
CERTIFICATE OF CORRECTION

PATENT NO. : 10,906,478 B2  
APPLICATION NO. : 16/265383  
DATED : February 2, 2021  
INVENTOR(S) : Mingher F. Shen, Nora Arellano and Ansari Ahamed Abdul Shukkoor Page 1 of 1

It is certified that error appears in the above-identified patent and that said Letters Patent is hereby corrected as shown below:

On the Title Page

Item (73), assignee 1, delete "Toyota Motor Engineering & Manufactuirng North America, Inc." and insert -- Toyota Motor Engineering & Manufacturing North America, Inc. --, therefor.

Signed and Sealed this  
Sixth Day of April, 2021

Drew Hirshfeld  
*Performing the Functions and Duties of the*  
*Under Secretary of Commerce for Intellectual Property and*  
*Director of the United States Patent and Trademark Office*